March 8, 1932.   V. C. ERNST   1,849,036

PHOTOGRAPHIC PROCESS AND AUXILIARY ELEMENT THEREFOR

Filed Dec. 23, 1926   5 Sheets-Sheet 1

INVENTOR:
VICTOR C. ERNST
by his atty

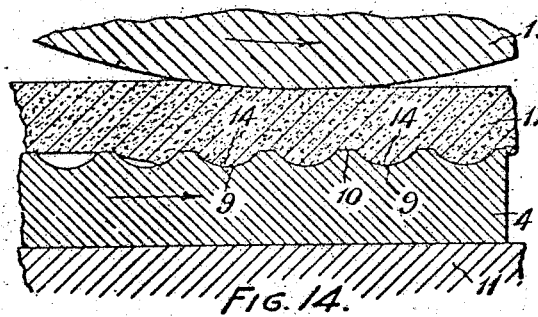
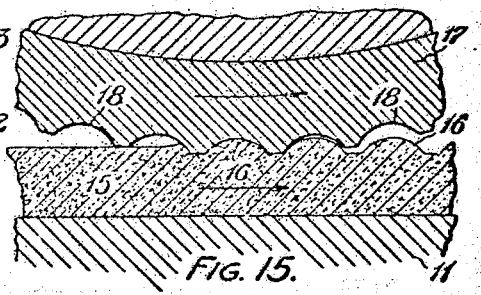
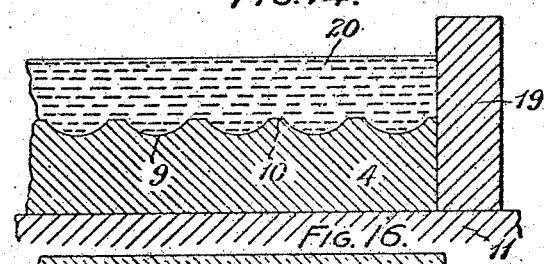
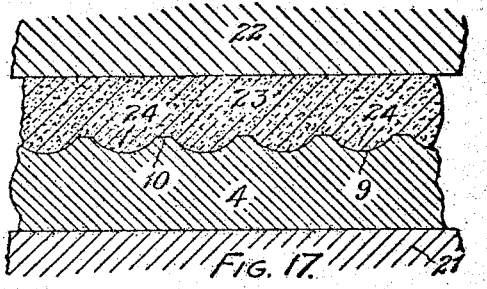
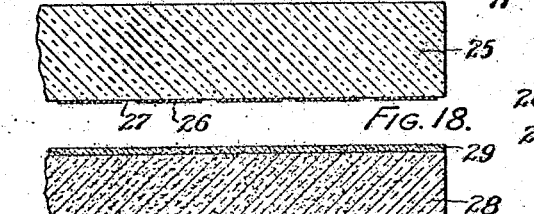
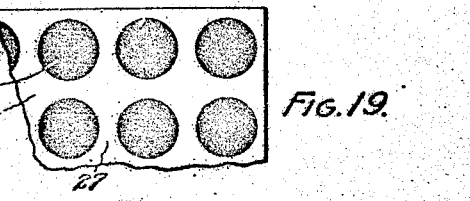
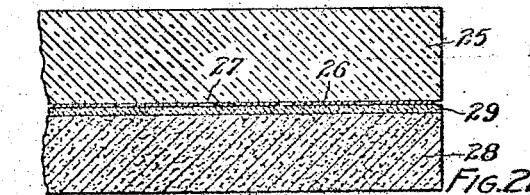
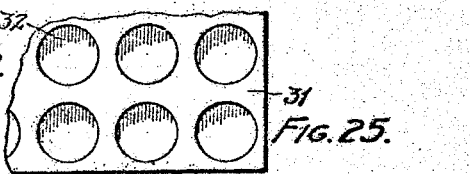
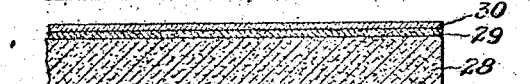
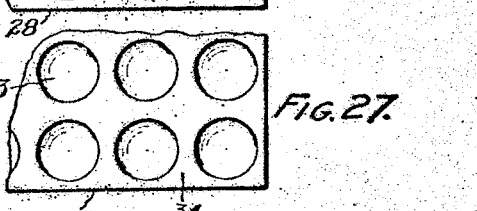
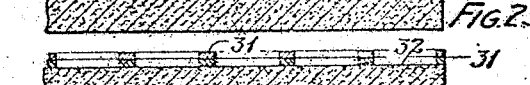
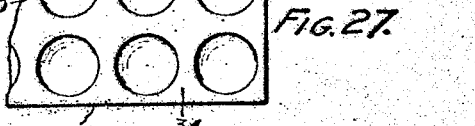
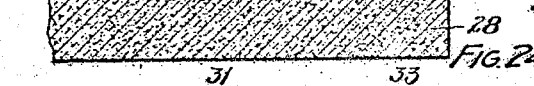
INVENTOR:
VICTOR C. ERNST INVENTOR:
VICTOR C. ERNST
by his atty

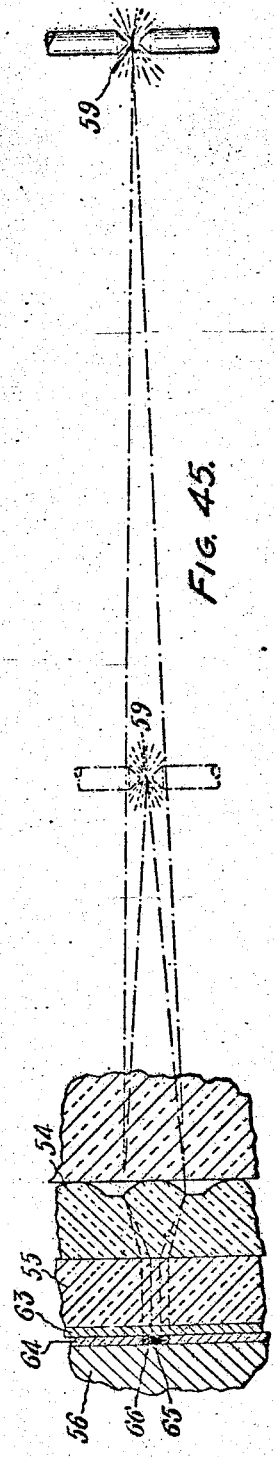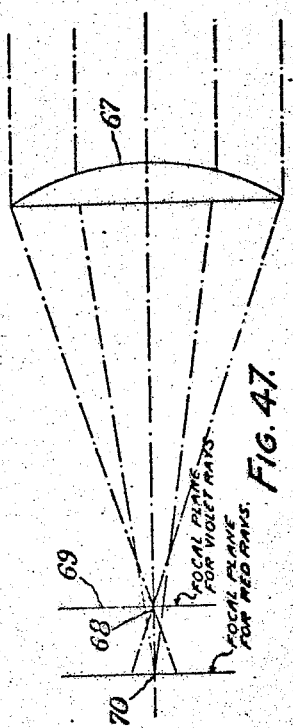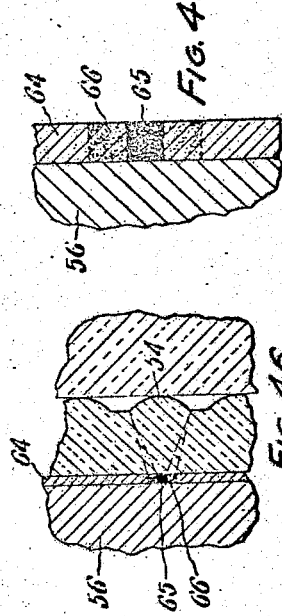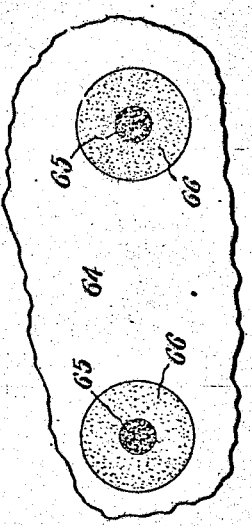

Patented Mar. 8, 1932

1,849,036

UNITED STATES PATENT OFFICE

VICTOR C. ERNST, OF LAKEWOOD, OHIO

PHOTOGRAPHIC PROCESS AND AUXILIARY ELEMENT THEREFOR

Application filed December 23, 1926. Serial No. 156,738.

My invention pertains to a process involving photography and is of use, for instance, in engraving and lithography; and applies the use of a multi-lensic screen in a novel manner for making printing plates of whatever material.

To instance improvements which my invention will cause to be realized, they may be considered as applied to the art of photolithography which, as to-day commercially practiced, comprehends:—

(1) The taking of a photograph involving loss of tonal and detail value in obtaining print therefrom.

(2) Preparation of a wet plate photograph of the print through a screen—to again lose values.

(3) Transfer of image on the wet plate to a plate, now more commonly of metal, which plate is supplied with an emulsion of say, albumin-ammonium bichromate—to again lose values.

(4) Hardening minute areas of the emulsion surfaces by light projection through the screen.

(5) Inking-over the plate with a water-resisting ink.

(6) Washing off the ink deposited on dot areas of whatsoever shape which were not light hardened to set the ink thereon or to which the ink does not firmly adhere.

(7) Etching the plate by the access of a suitable acid to the areas which are not ink-coated.

Several outstanding disadvantages attend the present lithographic procedure, notably:—(a) need of wet plates of varying sizes; (b) inability to enlarge or reduce from wet plate negatives because, to do so would vary the size of the dots in the negatives; (c) not infrequent requirement of plates as large as 40″ x 60″, which exceeds the size of the largest camera, therefore necessitating several photographs to be matched together with dot registry and having the same printing quality; (d) to emphasize different tones; a highly skilled artist is required to manipulate a brush under water to work away the ink adhering to dot margins preparatory to re-etching, but when so laboriously reducing the area of an ink-coated dot (with ammonia on zinc and with nitric acid on stone), the height of projection of the latter unfortunately also becomes reduced to result in unreliable or imperfect printing; (e) roundabout hence expensive procedure; (f) thick screens; (g) very expensive yet fragile glass screen.

The objects of my invention are to avoid the disadvantages just set forth.

My conception, in its preferred form, involves employment of a multitude of definitely arranged and preferably equispaced microscopically dimensioned lenses, molded together as an integral unit in the form of a thin flexible sheet of any desired size. A screen-etched plate, of which the cavities necessarily have curved bottoms, may be employed as a mold for producing the multi-lenses or lensic screen.

The process of utilizing such a series of microscopic lenses is adapted alike for contact printing or printing by projection. In either case, half-tone or screen plates are made by recording the image of a dry photographic negative as a light projected pattern coincidently with the creation of the dot-composed screen on the plate. The result of my discovery is the making of the dots harder in the center than at their margins because of the convergence of the light rays through each minute lens whereby the emulsion becomes more hardened at the center of each eventual dot than at its margin to cause the ink more firmly to adhere to the hardened centers. In contact printing either the negative is placed against the sensitized emulsion or printing surface on the plate and then the multi-lensic screen placed in contact with the negative and flatly so held or the position of the last two elements is reversed. In projection printing the multi-lensic screen is placed in proper focus in front of the sensitized surface so as to be adapted to project concentrated rays of sharp light and then the image of a negative is recorded on the sensitized plate, first through a projecting lens and then through the multi-lensic screen.

As will be readily understood by those conversant with the art, the concentration of light rays to the centers of intended upper dot surfaces will cause the ink-coating to be more firmly held there and thus facilitate the thinning or removal of the ink-coating at the margins of the upper dot surfaces. Here it may be emphasized, that while spherical and chromatic aberration have always been reckoned as contributing factors to imperfect results, this conception of mine, just referred to, utilizes both spherical and chromatic aberration to advantage, because, the diffused light, due to spherical aberration, desirably influences less strongly the marginal portions of the emulsion; and, because the different foci of the violet rays and of the red rays may be intercepted by the sensitized surface so that the focus of the more powerful violet rays is in the sensitized surface, which may be considered as the focal plane, and so that the imaginary focus of the red rays is rearwardly beyond or, in other words, so that the red rays intersect the sensitized surface to define a larger circle. However, a similar result may be achieved when using a one point source of light, by exposing to such light while successively held at varying distances from the sensitized surface, thereby varying the dot size.

The five sheets of drawings will show, the first, illustrations of the method of making the mold for the lensic screen; the second, illustrations of various processes of molding the lensic screen and of producing it by etching practice; the third, illustrations of different forms of lensic screens and different uses thereof; the fourth, illustrations of two alternative methods of using one of my novel lensic screens and the fifth, illustrations diagrammatically making clear how the advantages of use of my lensic screen may be realized in distinct ways.

Figure 12:
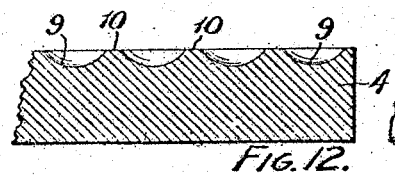
Figures 12 and 13 are corresponding views after both the ink and emulsion have been entirely removed.

Figure 14 on Sheet 2 is a cross-sectional view illustrating how my lensic screen may be formed by pressing a translucent material, such as celluloid, into a mold, like the one shown in Figure 12, by means of a smooth roller.

Figure 15 is a similar view modified to show the spherical concavities formed on a cylindrical roller.

Figure 16 illustrates the casting of the lensic screen.

Figure 17 illustrates the modified method of forming the lensic screen of suitable semi-plastic material by direct pressure.

Figures 18-27 are a series of views showing the method of making a plano-concave lensic screen by an etching process the steps being substantially the same as shown in the views on Sheet 1 but the base being material instead of a metal; Figures 18, 20, 22, 23, 24, 26 and 28 corresponding to Figures 1, 3, 5, 6, 8, 10 and 12 and Figures 19, 21, 25 and 27 corresponding to 2, 4, 9 and 11 respectively. Figure 19 being a plan view of Figure 18, Figure 21 a plan view of Figure 20, Figure 25 a plan view of Figure 24, and Figure 27 a plan view of Figure 26.

Figure 29:
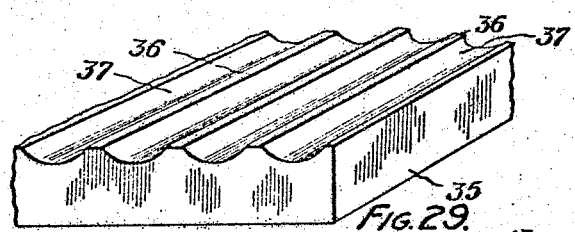

Figure 29 is a greatly enlarged fragmentary perspective view of a plano-concave lensic line screen.

Figure 30:
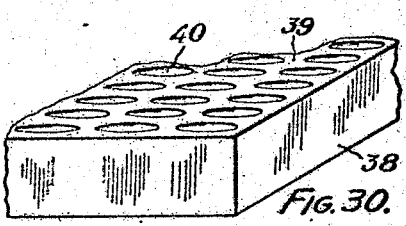

Figure 30 is a similar view of a plano-concave circular-lens screen.

Figure 31:
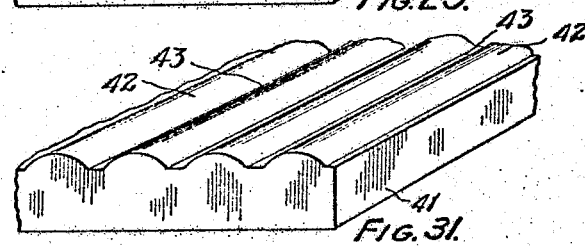

Figure 31 is a perspective view of a plano-convex line screen.

Figure 32:
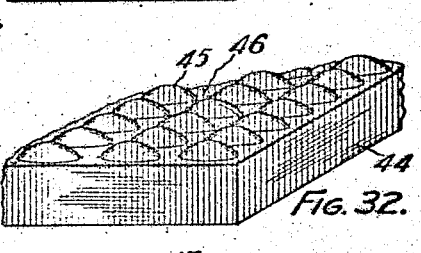

Figure 32 is a similar view of a plano-convex (spherical) lens screen.

Figure 33:
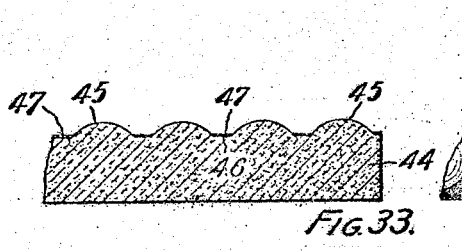

Figure 33 is a vertical section of the plano-convex lensic screen of Figure 32 showing the indented area coated with an opaque material apparently to intensify the light concentration through the separate lensic elements by elimination of parallel rays.

Figure 34:
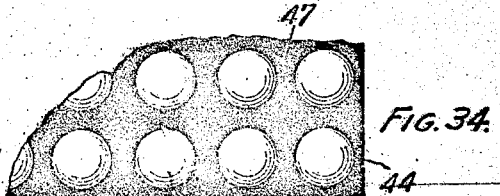

Figure 34 is a plan view of Figure 33.

Figure 35:
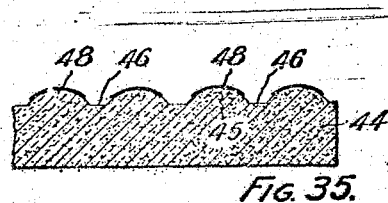
Figure 36:
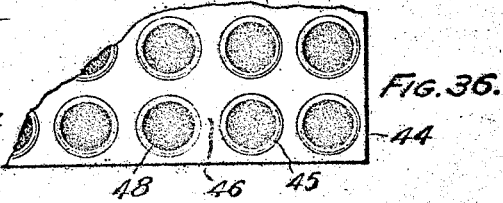

Figures 35 and 36 are views corresponding to the two preceding, showing central portions of the spherical lenses coated with an opaque material.

Figure 37:
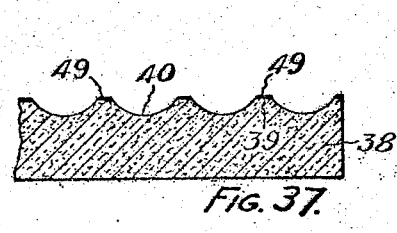
Figure 38:
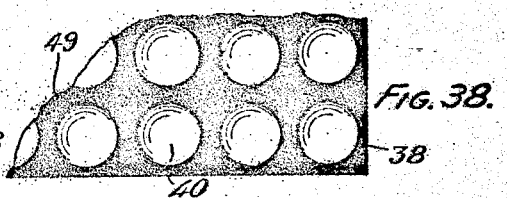

Figures 37 and 38 are a similar pair of views of a plano-concave lensic screen with the raised lens-separating area coated.

Figure 39:
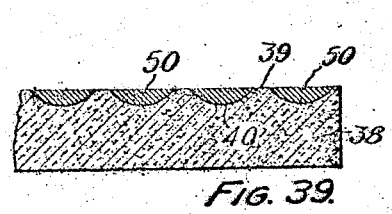
Figure 40:
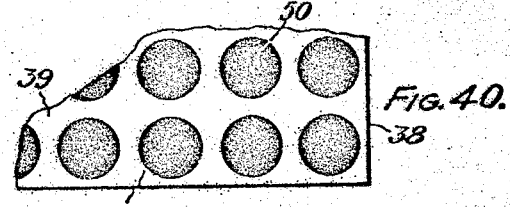

Figures 39 and 40 are another similar pair of views the reverse as to areas coated, with reference to the two preceding views.

Figure 41:
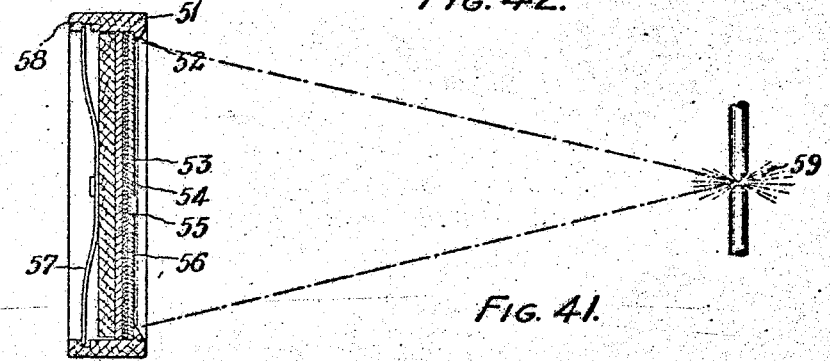

Figure 41 is a diagrammatic view showing the method of using my lensic screen for contact printing a negative on a sensitized element subject to becoming hardened upon exposure to light.

Figure 42:
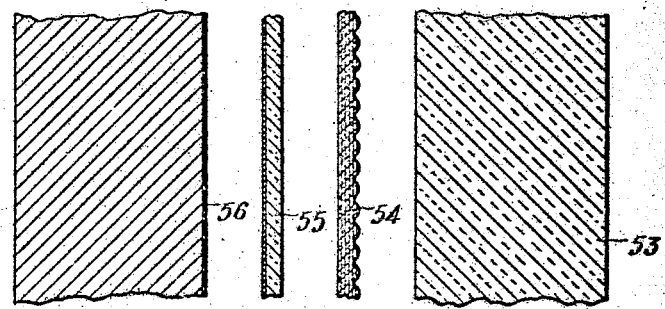

Figure 42 illustrates very much enlarged fragmentary sectional views showing one feasible assembly order of four elements illustrated in Figure 41.

Figure 43:
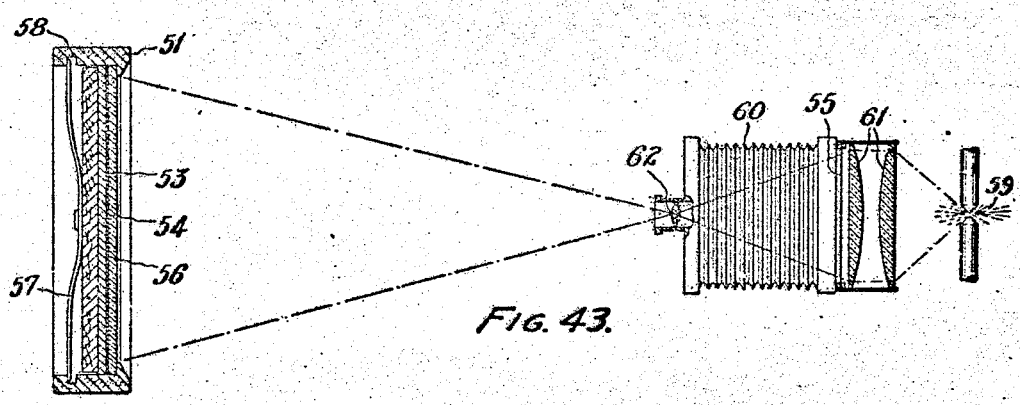

Figure 43 is a diagrammatic view showing the method of projecting, to enlarge or reduce, through my lensic screen to a sensitized element.

Figure 44:
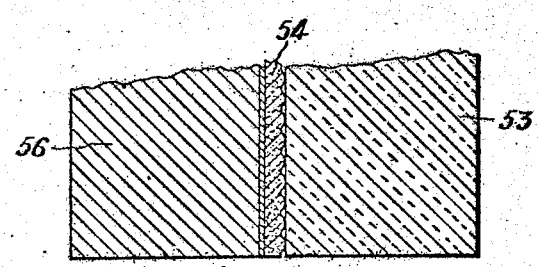

Figure 44 is a greatly enlarged fragmentary sectional view of the image recording elements held in contact with each other, as shown in Figure 43.

Figure 45 is a diagrammatic view to disclose how my lensic screen functionates during contact printing to more harden dot centers and to vary the size of dots by a shifting of the relative position of the screen and an artificial source of light.

Figure 46 is a view similar to the portion of Figure 45 directly over it to show how each distinct lens element functionates in practicing the projection process according to Figure 43.

Figure 47 is a diagrammatic view to illustrate how my conception advantageously employs spherical and chromatic aberration.

Figure 48 is a diagrammatic cross-section in that focal plane of Figure 47 in which the violet rays have their focus.

Figure 49 is a still further enlarged view to disclose the result of varying degrees of hardening of a circular emulsion area due either to the successive exposure of Figure 45 or to either of the aberrations according to Figure 47.

Figure 50 is a plan view on the same scale as Figure 49 showing two adjacent circular emulsion areas each having a central circle more hardened than its annular surrounding margin.

Figure 1:
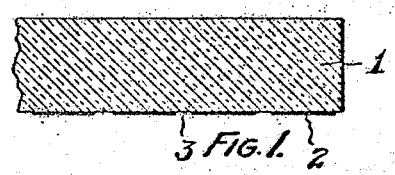
Figure 1 is a greatly enlarged fragmentary vertical section through a primary screen (glass, as shown) used in the process of making a mold for a plano-convex lensic screen embodying my inventions.
Figure 2:
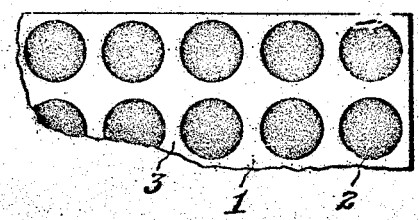
Figure 2 is a bottom plan view of Figure 1.
Figure 3:
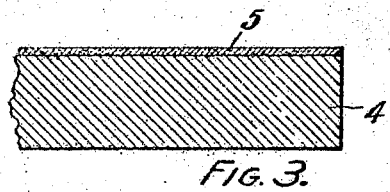
Figures 3 and 4 are a correspondingly enlarged vertical section and an enlarged plan view respectively, of a sensitized metal element for cooperation with the primary screen.
Figure 4:
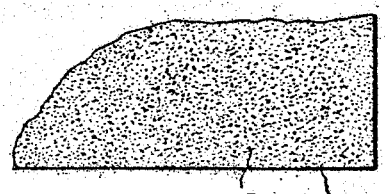
Figure 5:
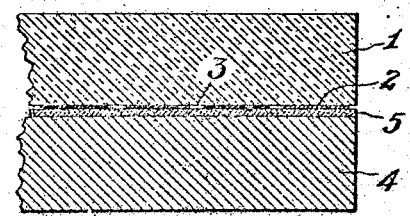
Figure 5 illustrates the primary screen in contact with the sensitized metal element preparatory to exposure of the latter to light passing through the former.
Figure 6:
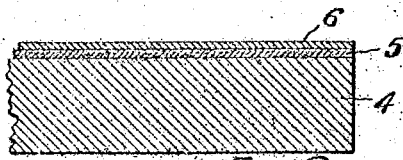
Figures 6 and 7 are a fragmentary vertical section and plan view respectively, of the sensitized metal element after its exposure and after it has been coated with an opaque water-resisting ink.
Figure 7:
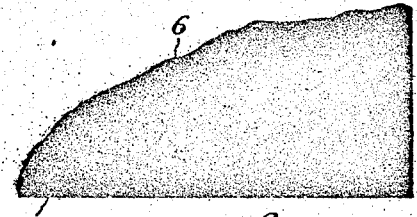

What I term a primary screen 1 of optical glass includes equispaced rows of circular areas coated with opaque patches 2 to leave an intervening transparent area 3. A metal plate 4 is coated on one side with an emulsion 5 to be considered as sensitive to light so as to harden on exposure thereto. In Figure 5 the primary screen 1 appears superimposed on the plate 4 preparatory to exposure to light downwardly directed. After the area of the emulsion surface 5, corresponding in shape and extent to the area 3, has become hardened by the passage of light through the transparent portion 3, the entire emulsion surface 5 is coated in a dark room with an opaque water-resisting ink 6, which has the property of more firmly adhering to that area of the emulsion 5 which has become hardened by exposure to light.

It is interpolated here, that an emulsion might be employed having precisely the opposite property from that explained as commonly possessed by the emulsion 5, so that such substitute emulsion would instead become softened upon exposure to light; and to be used in association therewith, one might employ a primary screen in which the area 3, instead of the areas 2, would be made opaque.

Figure 8:
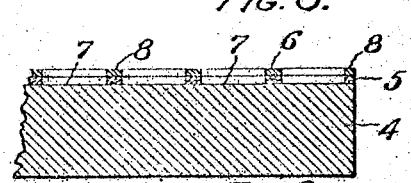
Figures 8 and 9 are a section and a plan view respectively, following the next step of washing.
Figure 9:
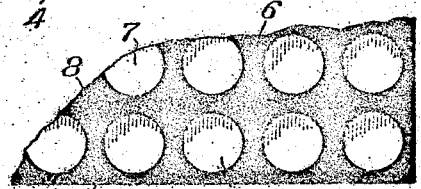
Figure 10:
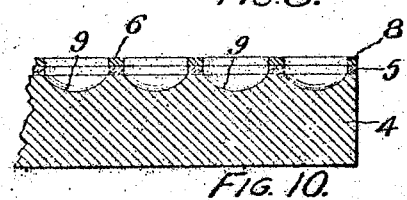
Figures 10 and 11 are corresponding views following the next step of etching.
Figure 11:
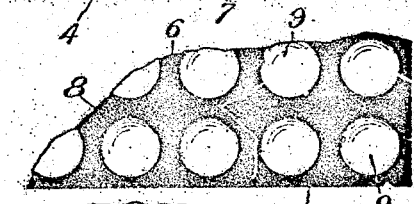

The doubly coated plate 4 is next washed to produce the result shown in Figures 8 and 9, wherein both the ink and emulsion, corresponding to the circular areas 2, has become removed to expose rows of equispaced circular areas 7 on the upper surface of the metal plate between which appear the upstanding intervening ink-coated area 8. Next, the circular areas 7 are etched out by any approved acid medium inevitably to form spherically surfaced concavities or recesses 9. Thereafter, the emulsion base 5 and ink-coating 8 are removed to leave the relatively elevated surface 10, of the plate 4, which surrounds the recesses 9 and to provide a multi-mold, of any desired size and number, to be used for molding a multi-plano-convex-spherical lensic screen embodying my invention.

Figure 13:
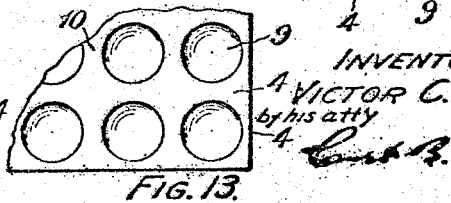

Having the mold, shown in Figures 12 and 13, any one of several methods of molding might be adopted, first, according to Figure 14 in which the mold is supported on a base 11 and then a sheet of translucent yielding material 12, such as celluloid, may be pressed against the mold through the agency of a roller 13 to cause spherical lens elements 14 to conform to the cavities.

As an alternative method of fabricating my lensic screen, not employing the method nevertheless here described according to the illustration of Figure 15 because likewise employing a pressing roller, a translucent sheet 15 is caused to rest on the support 11 and the multi-lens configuration 16, imparted thereto by means of a cylindrical roller 17, the operating surface of which is supplied with spherical concavities 18. The sheet 15 is preferably flexible so as not to limit its dimension as would be the case were it composed of friable material.

As other ways of using the lensic screen mold, either that shown in Figure 16 or that shown in Figure 17, may be followed. In the former, the base 11 supports raised walls 19 between which the fashioned mold is fitted preparatory to casting the lensic screen 20 in fluid state. In the latter, (Figure 17), the bolster plate 21, of a press, supports the mold and the ram 22, of a press, imparts, to a yielding translucent substance 23, lens elements 24 by the application of direct pressure.

Instead of employing the molding procedure, preferred for cleaning purposes, my microscopic lensic screen, of plano-concave design, may be evolved by the same series of steps of the etching process, in itself old, according to the series of seven views in columnar arrangement on Sheet 1. A primary screen 25 (Fig. 18) is provided on its lower surface with circular coated areas 26 of an appropriate opaque substance to leave the enveloping area 27, which will permit the passage of light. A sheet of lensic screen material 28, preferably of flexible translucent material, is then itself coated with an emulsion surface 29 on which is to be superimposed the opaque coated areas 26, as shown in Figure 22. Then, following exposure to light, the emulsion surface 29 is supplied with a water-resisting coating 30, following which, the non-hardened emulsion portions are washed off, together with the coating thereover, to leave a composite elevated surface enveloping relatively depressed circular areas 32, on the upper surface of the lensic screen material 28, and which circular areas 32 are then etched out with a suitable attacking fluid to form the spherically surfaced recesses 33, and finally, when the composite coating 31 has been removed, to expose the relatively raised area 34. It should be understood that the lensic screen, owing to its microscopic dimension and therefore extreme thinness the lensic screen in its fashioned form, as shown in Figure 28, should preferably be of flexible material so as not to limit its size for practical purposes, in other words, I realize that if the fashioned lensic screen, shown in Figure 28, be of glass, it must be of rather small planular compass because so thin. The perception is also to be credited to me that plano-concave, instead of plano-convex lensic screens, might be produced according to any of the four processes, shown in Figures 14–17 inclusive; and that plano-convex lenses, (spherically or cylindrically surfaced), might be produced according to the etching process disclosed on the lower half of Sheet 2.

Directing attention next to the different designs of lensic screens and different ways of coating them, as illustrated on Sheet 3, the plano-cylindrically concave or lensic line screen 35 (Fig. 29) has its upper surface 36 fashioned with parallelly extending cylindrically surfaced cavities 37 to constitute in use a plano-concave line screen. It is to be likewise understood, that all of the views on Sheet 3 are enormously enlarged as implied by my earlier use of the word microscopic, the lensic formation proper being as small as less than one hundredth of an inch.

Figure 30 discloses a plano-concave screen 38 having an upper surface 39 fashioned with spherically defined cavities 40. Figure 31 discloses a plano-convex line screen 41 which is the inverse of the screen shown in Figure 29 to include parallel convex cylindrical surfaces 42 divided by the channels 43. Figure 32 is also a fragmentary perspective view of a plano-convex lensic screen 44, which is the exact opposite of the one shown in Figure 30, to include convex spherically surfaced lenses proper 45, upstanding from a plane surface 46. The shading of this figure indicates red color, as one of several primary colors which could be used, whereby my lensic screen may simultaneously exercise the function of a filter. Figures 33 and 34 are section and plan views respectively, of a lensic screen, such as is shown in Figure 32, having the plane surface 46 coated with an opaque material 47, which might, for certain purposes, be desirable in order to intensify the concentrated light recordations at definitely arranged and equispaced points. Figures 35 and 36 show two views corresponding to the two preceding, with the exception that center portions of the distinct lens surfaces are coated at 48. Such a modified coating, of course, does not permit realization of one of the special advantages established by the use of my lensic screen, but while its light-contrasting recordation is no better than screens at present in use, it nevertheless retains the advantage of thinness plus flexibility and therefore substantially limitless area. Figures 37 and 38 are the equivalent in principle of the coating disclosed in Figures 33 and 34, whereas the structure of the lensic screen, in Figures 37 and 38, corresponds to the one shown in Figure 30, the plane surface 39 being supplied with an opaque coating 49. Figures 39 and 40 are the equivalent in principle to the coating disclosed in Figures 35 and 36, whereas the structure of the lensic screen in Figures 39 and 40 also corresponds to that shown in Figure 30, the cavities 40 being filled with an opaque substance 50.

The diagrammatic view shown in Figure 41 illustrates a common type of printing frame 51 interiorly defined by a flange 52 against which is fitted a pane of clear glass 53, against which is placed either side of my preferred form of color dyed lensic screen 54, against which is placed the smooth side of a photographic negative 55 and against the image side of which is placed the emulsion coating of a sensitized element 56. The contactual relationship of the glass 53, lensic screen 54, negative 55 and sensitized element 56 is maintained by a backing strip carrying a spring 57 adapted to have its ends turned into channels 58, whereby all of the parts are held pressed against the flange 52 in the customary manner. An artificial source of light 59 directs its rays to effect the printing operation. The assembly order, indicated in Figure 42, may be further varied by reversing the negative 55 if no prism was used for the same purpose during the photographing which secured the image thereon.

Figure 43 diagrammatically illustrates the practice of my method for projection work, or when it is desired to enlarge or reduce. To be desired is the same source of light 59, a suitable camera 60 provided at its rear with a pair of relatively reversed condensing lenses 61, beyond which, with reference to the light 59, is the negative 55. The projection of the image of the negative 55 is accomplished through a lens 62 for recordation and transfer in the same printing frame 51, where the glass 53, lensic screen 54, and sensitized element 56 are similarly assembled except for the omission there of the negative 55.

The views on the last sheet of the drawings disclose the improved results I have achieved. Figure 45 is a diagrammatic view indicating light rays emanating from the source of light 59 while successively placed at differing distances from the printing frame, which latter has been omitted from the views on this last sheet, because of the still greater enlarged scale.

Here shown, is the result of the light rays reaching one distinct microscopic lens of those on the lensic screen 54 beyond which, preparatory to contact printing, are the negative 55 and the sensitized element 56 in the order stated. It is to be noticed, that the image carrying side 63 of the negative is in contact with the emulsion coating 64 of the sensitized element. The duplex projection lines indicate, not only the concentration of light at the center of a particular dot more greatly to harden the emulsion 64 there, but also indicate how the size of the dot may be varied according to the distance of the light 59 from the printing frame, because, when a one point source of light is brought closer its image necessarily becomes larger and hence, the hardened dot area is either the size of the center 65, or of the greater concentric circle 66.

Figure 46 is a view on similar scale, corresponding to that portion of 45 directly above it, of the recording assembly during the projection process disclosed in Figure 43, it being evident that the negative 55 is absent for the same reason that it is so in Figure 44.

Figure 47 illustrates diagrammatically how and why I advantageously utilize any spherical and chromatic aberration. A lens 67 may be presumed to have some measure of spherical aberration to result in a corresponding measure of diffusion around the point 68 where ideally, all the rays of a bundle, projected through the plano-convex lens 67, would meet in a focal plane 69. Therefore, if the circle 66 be regarded as comprehending the complete dot area desired, it is manifest that it will desirably have the relatively harder central portion 65 because of such diffusion. Figure 47 also reveals how chromatic aberration is utilized to effect the same particular resultant advantage. The different foci of the violet rays and of the red rays are particularly utilized in the same desirable manner, and since the violet rays are more refrangible and stronger in their effect on sensitized emulsion, their focus is contrived to be the point 68 in the focal plane 69. The focus 70 of the red rays being beyond, necessarily results in a circular trace made by the red rays on the intercepting focal plane 69, such that the circular area comprehended by the recordation on a sensitized emulsion, supposedly occupying the focal plane 69, will correspond to the size of the circle 66. In consequence, chromatic aberration may similarly be advantageously utilized to achieve a dot whose total circular area may be considered as that designated as 71 in Figure 48 with a hardened center 72.

A sharply defined dot is an attainment which has always been striven for. My invention achieves this primary aim more directly, more easily and more cheaply and permits the use of dry plates, which term is to be understood as comprehending film, which have the great advantage of remaining preserved without deterioration over a longer period of time. My invention also retains the original values of a photograph and eliminates expansive art work now devoted both before the use of a screen and again to tone down the margins of dot groups. My invention eliminates the need of large photographic plates or films, because permitting projection directly from a small original negative without altering the size of dots, which is not possible in the case of wet plates having a screen incorporated therein, because the result would inevitably be to vary the size of the dots. Of course, my discovery of a lensic screen is equally applicable to successful use with wet plates which could, however, never be preferred to dry plates for the reasons already mentioned. I am aware that dry plates have been used for color separation and a screen positioned in a camera for projection to an emulsion surface, but that practice obviously belongs to a distinct art. During the printing operation through a negative or a positive photographic image, contact between the elements, which light is to reach, heretofore has meant sharpness or clarity of the transferred image and accordingly the image-carrying side of a plate or film had to be in contact with the print paper or the emulsion-coated plate and for the same reason the screen could not be out of contact and, of course, was not when incorporated in the wet plate. As contradistinguished, my lensic screen permits reversible use and interchangeable positioning of certain elements of those shown, for instance, in Figure 42 and as explained in the description of such figure.

It is to be realized that the scope of my invention, comprehends many equivalent methods and constructions. The showing of the drawings and the particular description are merely specific exemplifications of a plurality of mechanical embodiments and arrangements.

I claim:

1. The hereindescribed process of utilizing chromatic aberration of a lens by causing a sensitized element, adapted to harden upon exposure to light, to intercept light rays, projected through a lens, at the focal plane of the violet rays composing said light whereby to produce a relatively harder central point of the light intercepting area.

2. The process of modifying a sensitized surface adapted to harden upon exposure to light, which consists in projecting light through a lensic screen with the most refrangible rays focusing on said surface, and through a negative while one of said last two mentioned elements is interposed between the other two.

3. The hereindescribed process of half-tone photographic reproduction which consists in arranging a sensitized element, a negative and a lensic screen in an optical trail and causing a projection of light along said trail through said negative and screen to said element while predeterminately adapting the different refrangibility of light of different colors passing through said screen and negative to said element so as variously to modify bordering microscopic portions of the latter according to the microscopically different focal planes of rays of different color relative to the plane chosen for the surface of said sensitized element.

4. The process of modifying a sensitized element adapted to harden upon exposure to light, which consists in directly projecting light to said element through a lensic screen predeterminately arranged to focus violet rays on said element and causing said light also to pass through a photographic negative prior to reaching said element.

5. The process of modifying a sensitized element adapted variously to harden upon exposure to pattern-forming light rays, which consists in directing such light rays to said element through a lensic screen predeterminately adapted to focus light rays of one color on said element.

6. In apparatus of the character described, the combination of a negative and a lensic screen, said two elements being arranged in an optical trail and means for directing light through said two elements to a photographically sensitized article, the arrangement being such as predeterminately to effect focus of the light rays of one color on the surface of said article.

7. In a process of the character described, the step of variously hardening a light-sensitive area by controlling the intensity of light permitted to reach different concentric portions of said area by selectively causing rays of a certain color of those composing the differently colored rays of light to be brought to a focus on said sensitive area.

8. The process of modifying a sensitized element adapted variously to harden upon exposure to image-forming light rays, which consists in directing such light rays to said element through a lensic screen of a primary color and arranged with respect to the recording surface of said element so as to focus light rays of one color on said element.

9. In a process of the character described, the procedure of variously hardening a light-sensitive substance by controlling the intensity of light rays permitted to reach bordering microscopic portions of said area by refracting some of said rays and by definitely locating the plane of said intercepting sensitive area so that said plane coincides with the focal plane of certain of said refracted rays.

10. In the hereindescribed process, the step of simultaneously affecting different portions of each of a series of sensitized areas of a sensitized element in varying degree by refracting to said areas respectively light rays through a corresponding series of lenses having violet ray focii at the centers of said areas.

11. The hereindescribed process of adapting chromatic aberration of the lenses of a lensic screen by intercepting concentrically converging violet and red rays respectively with a substance subject to becoming variously hardened upon exposure to said distinct rays and which substance has an outer surface coinciding with correspondingly arranged portions of the common focal plane of the violet rays.

12. The combination for use in photographic printing, of a negative and a lensic screen of predetermined thickness, together with means for directing light through said lensic screen and negative to a sensitized element adapted to harden when exposed to light, the thickness of said screen being so chosen as to effect focii of the violet rays in said element.

13. The process of half-tone reproduction, which consists in causing different portions of a sensitized surface to be variously modified as to hardness by refracting light thereto through microscopic objectives of a lensic screen after ascertainment of the character of the aberration of the particular objectives being used and establishment of the consequential focal plane for refracted rays of one color to produce the variously modified complete dot areas desired.

14. The hereindescribed process of half-tone reproduction which consists in arranging a sensitized element, and a lensic screen in an optical trail and adapting the different refrangibility of light of different colors passing from said screen to said element by causing refracted focus on said element of the rays of only one color so as variously to modify as to hardness circular and enclosing, annular microscopic portions of the emulsion of the latter.

Signed by me, this 20th day of December, 1926.

VICTOR C. ERNST.